(12) United States Patent
Baek

(10) Patent No.: US 11,405,673 B2
(45) Date of Patent: Aug. 2, 2022

(54) BOUNCE RATE MEASURING APPARATUS FOR BROADCASTING SERVICE

(71) Applicant: ANYPOINT MEDIA CO., LTD., Seoul (KR)

(72) Inventor: Wonjang Baek, Seongnam-si (KR)

(73) Assignee: ANYPOINT MEDIA CO., LTD., Seoul (KR)

( * ) Notice: Subject to any disclaimer, the term of this patent is extended or adjusted under 35 U.S.C. 154(b) by 106 days.

(21) Appl. No.: 16/894,848

(22) Filed: Jun. 7, 2020

(65) Prior Publication Data

US 2020/0304852 A1  Sep. 24, 2020

Related U.S. Application Data

(63) Continuation of application No. PCT/KR2018/014240, filed on Nov. 20, 2018.

(30) Foreign Application Priority Data

Dec. 18, 2017 (KR) ........................ 10-2017-0173749

(51) Int. Cl.
*H04N 21/24* (2011.01)
*H04N 21/262* (2011.01)
(Continued)

(52) U.S. Cl.
CPC ...... *H04N 21/25808* (2013.01); *H04H 20/33* (2013.01); *H04H 60/33* (2013.01)

(58) Field of Classification Search
None
See application file for complete search history.

(56) References Cited

U.S. PATENT DOCUMENTS 10,057,648 B1 * 8/2018 Harijan ............. H04N 21/4667
2008/0250447 A1  10/2008 Rowe et al. .................... 725/32
(Continued)

FOREIGN PATENT DOCUMENTS

CN  101321267 A  12/2008
CN  104410906 A  3/2015
(Continued)

OTHER PUBLICATIONS

International Search Report dated Feb. 25, 2019, issued to International Application No. PCT/KR2018/014240.
(Continued)

*Primary Examiner* — Brian T Pendleton
*Assistant Examiner* — Jean D Saint Cyr
(74) *Attorney, Agent, or Firm* — Stein IP, LLC

(57) ABSTRACT

There is provided a bounce rate measuring apparatus for a broadcasting service. The bounce rate measuring apparatus includes programs that are stored in memories and executed by processors. The programs include a first instruction for generating service provision information on provision of channels of broadcasting service; a second instruction for analyzing the service provision information to determine a first number based on the number of times that each channel is provided for a time period longer than or equal to a first threshold during a predetermined period and a second number based on the number of times that each channel is provided for a time period longer than or equal to the first threshold and shorter than or equal to a second threshold during the predetermined period; and a third instruction for extracting bounce rate information of each channel based on the first number and the second number.

15 Claims, 5 Drawing Sheets

(51) Int. Cl.
   *H04N 21/422*  (2011.01)
   *H04N 21/442*  (2011.01)
   *H04N 21/258*  (2011.01)
   *H04H 20/33*   (2008.01)
   *H04H 60/33*   (2008.01)

(56) References Cited

U.S. PATENT DOCUMENTS

| | | | | |
|---|---|---|---|---|
| 2011/0078628 | A1* | 3/2011 | Rosenberg | G06Q 30/02 |
| | | | | 715/811 |
| 2015/0134673 | A1* | 5/2015 | Golan | G06F 16/44 |
| | | | | 707/748 |

FOREIGN PATENT DOCUMENTS

| | | |
|---|---|---|
| JP | 2002-158627 A | 5/2002 |
| JP | 2014-42124 A | 3/2014 |
| KR | 10-2009-0064142 A | 6/2009 |
| KR | 10-2011-0065945 A | 6/2011 |
| KR | 10-2015-0004685 A | 1/2015 |
| KR | 10-1751708 B1 | 7/2017 |
| KR | 10-2030439 B1 | 10/2019 |
| WO | WO 01/65747 A1 | 9/2001 |
| WO | WO 2017/119604 A1 | 7/2017 |

OTHER PUBLICATIONS

Korean Office Action dated May 10, 2019, issued to Korean Application No. 10-2017-0173749.
First Office Action dated Jul. 6, 2021, issued in the corresponding Chinese Application No. 201880081381.7.
Extended European Search Report dated Apr. 15, 2021 in the corresponding European Application No. 18 892 769.3.
The First Examination Report dated Jun. 1, 2022, in the corresponding European Application No. 18 892 769.3.

* cited by examiner

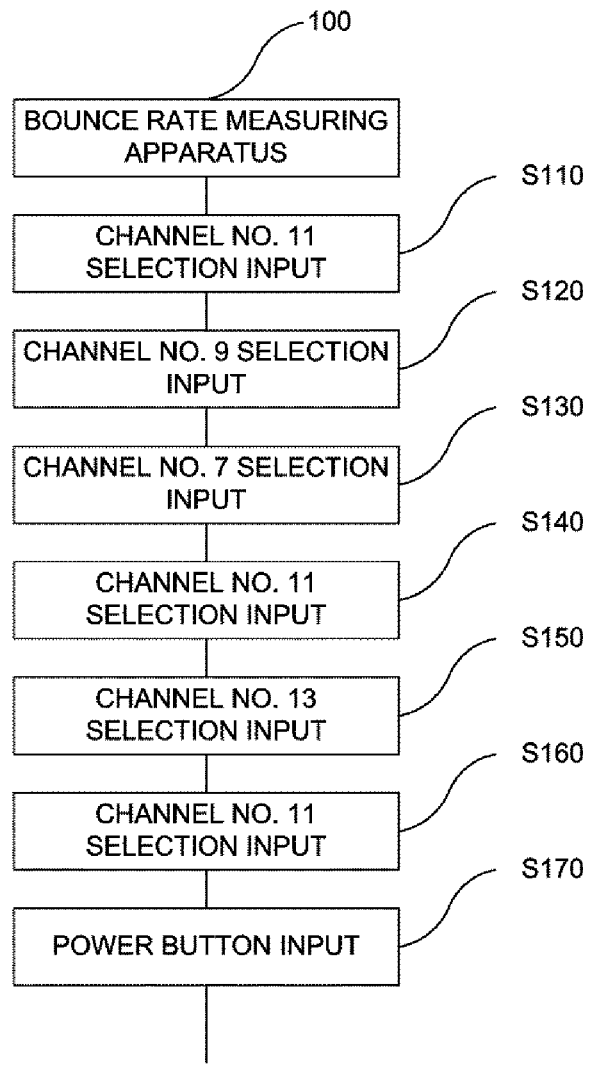

FIG. 7

| CHANNEL NO.11 | |
|---|---|
| 07:15:05 AM | 07:15:24 AM |
| 07:50:23 AM | 07:50:25 AM |
| 08:05:10 AM | 08:05:30 AM |
| 08:30:10 AM | 08:50:30 AM |
| 09:10:00 AM | 09:40:30 AM |
| . | . |
| . | . |
| . | . |
| 10:05:00 PM | 10:50:30 PM |

FIG. 8

| CHANNEL NO.11 | |
|---|---|
| 07:15:05 AM | 19 SEC |
| 07:50:23 AM | 2 SEC |
| 08:05:10 AM | 20 SEC |
| 08:30:10 AM | 20 SEC |
| 09:10:00 AM | 10 MIN 30 SEC |
| . | . |
| . | . |
| . | . |
| 10:05:00 PM | 45 MIN 30 SEC |

BOUNCE RATE MEASURING APPARATUS FOR BROADCASTING SERVICE

CROSS-REFERENCE TO RELATED PATENT APPLICATION

This application is a bypass continuation of International Application No. PCT/KR2018/014240, filed on Nov. 20, 2018, in the WIPO, and Korean Patent Application No. 10-2017-0173749, filed on Dec. 18, 2017, in the Korean Intellectual Property Office, the entire contents of which are hereby incorporated by reference.

BACKGROUND

1. Field

The present disclosure relates to a bounce rate measuring apparatus for measuring a bounce rate of a broadcasting service.

2. Description of the Related Art

The development in communication technologies and computing technologies is leading to fast development in broadcasting services. The ratings (viewer ratings) of the broadcasting services are measured to evaluate the efficiency of the broadcasting services. For example, a broadcasting service provider may use the ratings as a reference to evaluate quality such as viewer's satisfaction for the broadcasting services, and an advertiser may use the ratings as a reference to determine the advertisement effects from the broadcasting services.

The ratings are measured by selecting a sample group having uniform distribution in terms of, e.g., geographic location, age, gender, and education level, and collecting viewing behavior information about the broadcasting services provided to the sample group.

Since, however, the conventional rating measurement method measures the ratings of the sample group, the measured ratings are different from the actual ratings. In addition, since a complicated method is used to measure the ratings, even the ratings of the sample group are not accurately measured.

In order to solve such a drawback, Korean Patent No. 10-1751708 (Patent Document 1) entitled "Analysis method and system for audience rating and advertisement effects based on viewing behavior recognition", which was filed on Aug. 17, 2012 and registered on Jun. 22, 2017 by Electronics and Telecommunications Research Institute, discloses therein a method of measuring an audience rating of a sample group with higher accuracy by receiving a viewer image, generating viewer recognition information based on the received image, and generating viewing behavior information based on the viewer recognition information.

However, the method disclosed in Korean Patent No. 10-1751708 also uses a complicated method such as pre-registration of viewers for measuring the audience rating.

Meanwhile, the bounce rate generally represents a percentage of visitors who visit a website and then leave without receiving information or rather than continuing to view other pages within the website. More specifically, the bounce rate represents a percentage of visitors who visit a website having a start page and a sub-page linked to the start page and then leaves without visiting the sub-page. A high bounce rate typically indicates that visitors only view a website with a low probability of behavior such as product purchase. A low bounce rate indicates that visitors view a website and proceeds to behavior such as product purchase at a high probability. Therefore, the bounce rate can be used as a reference for evaluating especially websites on the internet.

However, the bounce rate is used as a reference that can only be applied to the internet services such as a web page, and such a bounce rate cannot be applied to the broadcasting services. In other words, the broadcasting services provide contents continuously unlike the web page, so that there are no start page and no sub-pages. Therefore, the bounce rate applied to internet services cannot be applied to the broadcasting services.

RELATED ART DOCUMENT

[Patent Document]
Patent Document 1: Korean Patent No. 10-1751708

SUMMARY

Described herein is a technique capable of providing a bounce rate measuring apparatus for measuring a bounce rate of a broadcasting service using service provision information generated based on a viewer's behavior of selecting a channel and leaving the channel.

According to one aspect of the technique of the present disclosure, there is provided a bounce rate measuring apparatus for a broadcasting service including: one or more processors; one or more memories; and one or more programs that are stored in the one or more memories and executed by the one or more processors. The one or more programs includes: a first instruction that, when executed, generates service provision information including information on provision of one or more channels among a first channel to a m-th channel of the broadcasting service (where m is a natural number of 2 or higher); a second instruction that, when executed, analyzes the service provision information to determine a first number of times based on the number of times that each of the one or more channels is provided for a time period longer than or equal to a first threshold during a predetermined period and a second number of times based on the number of times that each of the one or more channels is provided for a time period longer than or equal to the first threshold and shorter than or equal to a second threshold during the predetermined period; and a third instruction that, when executed, extracts bounce rate information of each of the one or more channels based on the first number of times and the second number of times.

BRIEF DESCRIPTION OF THE DRAWINGS

FIG. 5 shows a process of selecting a channel and leaving the channel in the bounce rate measuring apparatus according to the embodiments described herein.

FIGS. 6 to 8 show examples of service provision information generated by the process shown in FIG. 5.

DETAILED DESCRIPTION

Figure 1:
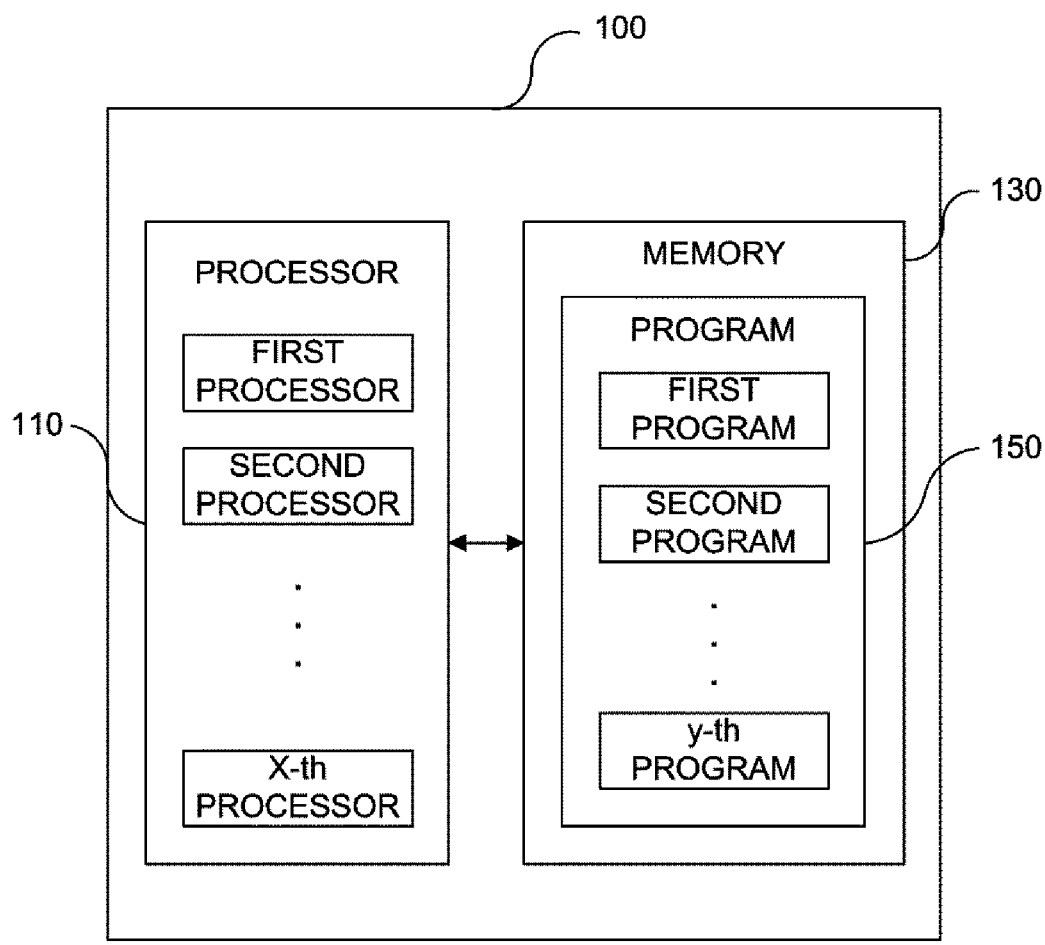
FIG. 1 is a block diagram showing an exemplary configuration of a bounce rate measuring apparatus according to one or more embodiments described herein.

Hereinafter, one or more embodiments (also simply referred to as "embodiments") of a bounce rate measuring apparatus for broadcasting services according to the technique of the present disclosure will be described in detail with reference to the accompanying drawings. In the drawings for describing the embodiments of the present disclosure, only a part of the practical configurations may be illustrated, a part of the practical configurations may be omitted or changed, and relative dimensions and proportions of parts therein may be exaggerated or reduced in size for the sake of convenience of description.

First Embodiment

FIG. 1 is a block diagram showing an exemplary configuration of a bounce rate measuring apparatus according to the embodiments described herein.

Referring to FIG. 1, a bounce rate measuring apparatus 100 according to the embodiments described herein includes one or more processors 110, one or more memories 130, and one or more programs 150 that are stored in the one or more memories 130 and executed by the one or more processors 110. The one or more processors 110 may be implemented by a semiconductor device such as a CPU (Central Processing Unit). The one or more memories 130 may be implemented by a semiconductor device such as a flash memory and a HDD (Hard Disk Drive).

The one or more processors 110 read and execute the one or more programs 150 stored in the one or more memories 130. In FIG. 1, the number of processors 110 is x where x is a natural number and, thus, there may be one processor 110 or multiple processors 110. In other words, the function of the bounce rate measuring apparatus 100 can be realized by one processor or a cooperative operation of multiple processors. For example, the function of the bounce rate measuring apparatus 100 can be realized by causing a first processor to execute a calculation function and a second processor to execute a communication function.

The one or more memories 130 store the one or more programs 150. The one or more memories 130 are storage medium such as a non-volatile memory or a volatile memory that is computer-readable storage medium. In FIG. 1, although one memory 130 is illustrated, there may be multiple memories 130.

Further, in FIG. 1, the number of programs 150 is y where y is a natural number and, thus, there may be one program 150 or multiple programs 150. In other words, the function of the bounce rate measuring apparatus 100 can be realized by one program or by a cooperative operation of multiple programs. For example, the function of the bounce rate measuring apparatus 100 can be realized by causing a first program to execute a calculation function and a second program to execute a communication function.

Hereinafter, the one or more processors 110, the one or more memories 130, the one or more programs 150 will be referred to as "processor 110," "memory 130," and "program 150," respectively.

Figure 2:
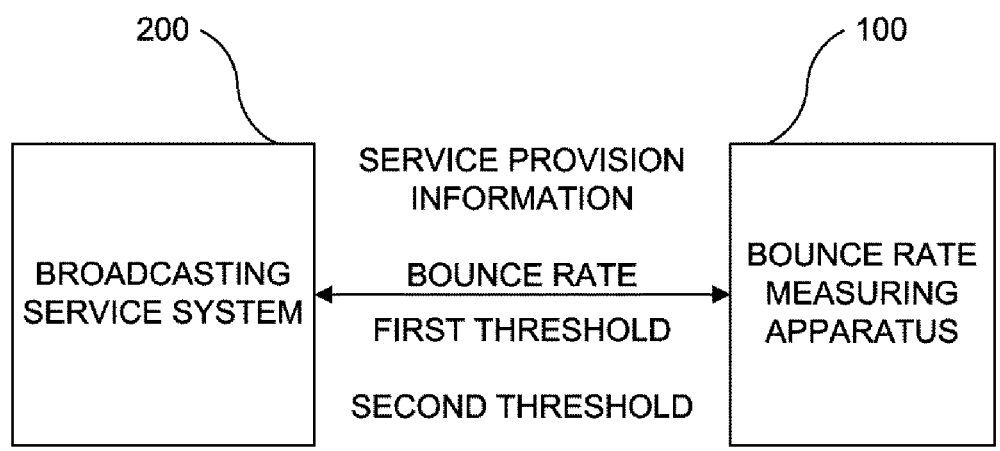
FIG. 2 shows a system environment in which the bounce rate measuring apparatus according to the embodiments described herein.

FIG. 2 shows a system environment in which the bounce rate measuring apparatus according to the embodiments described herein operates.

Referring to FIG. 2, the system environment in which the bounce rate measuring apparatus according to the embodiments described herein operates includes the bounce rate measuring apparatus 100 and a broadcasting service system 200.

The bounce rate measuring apparatus 100 may be a receiver that receives and provides digital broadcasting such as a set-top box, a television, a personal computer, and a mobile communication terminal having a computing function. In this specification, "digital broadcasting" refers to broadcasting services such as digital terrestrial broadcasting, digital cable broadcasting, digital satellite broadcasting, digital multimedia broadcasting (DMB), internet protocol television (IP-TV), over the top (OTT), and video on demand (VOD) broadcasting. Preferably, the bounce rate measuring apparatus 100 is configured to perform two-way communication such as a receiver for IP-TV, and transmit and receive data to and from the broadcasting service system 200. However, the bounce rate measuring apparatus 100 may be provided as a separate module, in addition to the receiver, and connected to the receiver. Hereinafter, the case where the bounce rate measuring apparatus 100 is the receiver will be described. In other words, it is assumed that the bounce rate measuring apparatus 100 executes a function of receiving and providing digital broadcasting and a function of measuring a bounce rate.

In the specification, "bounce rate" is defined and used to evaluate the quality of the broadcasting services. In the specification, the bounce rate is defined as follows.

a) Bounce Rate of Channel

The bounce rate of a channel is calculated based on information on the provision of a specific channel among a first channel 300-1 to a m-th channel 300-$m$ (m being a natural number greater than or equal to 2), i.e., the provision of a i-th channel (i being a natural number greater than or equal to 1 and smaller than or equal to m) through the bounce rate measuring apparatus 100.

Bounce rate of an $i$-th channel=(the number of times that the $i$-th channel is provided through the receiver for a time period longer than or equal to a first threshold and shorter than or equal to a second threshold during a predetermined period)/(the total number of time that the $i$-th channel is provided through the receiver for a time period longer than or equal to the first threshold during the predetermined period)    <Equation 1>

In the equation 1, the predetermined period is a period for measuring a bounce rate, e.g., one day, one week, or one month.

The first threshold is determined while considering a delay time from when the receiver receives a user input of selecting the i-th channel to when the i-th channel is signal-processed and provided to a viewer. For example, a predetermined period of time may be required from when the receiver receives the user input of selecting the i-th channel, e.g., a channel No. 11, to when the channel No. 11 is signal-processed and provided to the viewer. In addition, the viewer can select a desired channel by pressing a channel-up button instead of directly selecting a channel number. The first threshold is determined while considering such a period of time. For example, the first threshold may be set to three seconds. The first threshold is determined by, e.g., the broadcasting service system 200, and the bounce rate measuring apparatus 100 use the first threshold after receiving the first threshold from the broadcasting service system 200.

Alternatively, the bounce rate measuring apparatus 100 may directly determine and use the first threshold, instead of receiving the first threshold from the broadcasting service system 200.

The second threshold is dynamically determined based on identification information of the i-th channel. Specifically, the second threshold is dynamically selected from a plurality of thresholds based on the identification information of the i-th channel and can vary depending on the characteristics of the channel or the characteristics of the contents of the channel. For example, when the i-th channel is a news channel, the second threshold is set to 10 seconds; when the i-th channel is a movie channel, the second threshold is set to 20 seconds; and when the i-th channel is a home shopping channel, the second threshold is set to 30 seconds. The second threshold is a period of time required for the viewer who has selected the i-th channel and has checked the content of the i-th channel to determine whether to keep watching the i-th channel or to switch to another channel. In other words, the second threshold indicates a period of time required for a viewer to determine whether or not to keep watching the i-th channel without channel zapping. The second threshold is dynamically determined by, e.g., the broadcasting service system 200, and the bounce rate measuring apparatus 100 uses the second threshold after receiving from the broadcasting service system 200. Alternatively, the bounce rate measuring apparatus 100 may directly determine and use the second threshold, instead of receiving the second threshold from the broadcasting service system 200. Further, the bounce rate measuring apparatus 100 may also directly determine the second threshold based on the channel identification information.

Hereinafter, in the specification, the bounce rate of the i-th channel will be expressed as follows:

BR (identification information of the i-th channel, start point of period, end point of period, first threshold, second threshold).

For example, BR (channel No. 11, 2017-11-1 00:00:00, 2017-11-30 23:59:59, 3 seconds, 10 seconds) indicates a bounce rate of the channel No. 11 that is measured while setting the first threshold to 3 seconds and the second threshold to 10 second during one month from November 1, 2017 at 00:00:00 to November 30, 2017 at 23:59:59.

b) Bounce Rate of Content

The bounce rate of a content is calculated based on information on the provision of a specific content through the receiver.

Bounce rate of a content=(the number of times that the specific content is provided through the receiver for a time period longer than or equal to the first threshold and shorter than or equal to the second threshold during a predetermined period)/(the total number of times that the specific content is provided through the receiver for a time period longer than or equal to the first threshold during the predetermined period)  <Equation 2>

Figure 3:
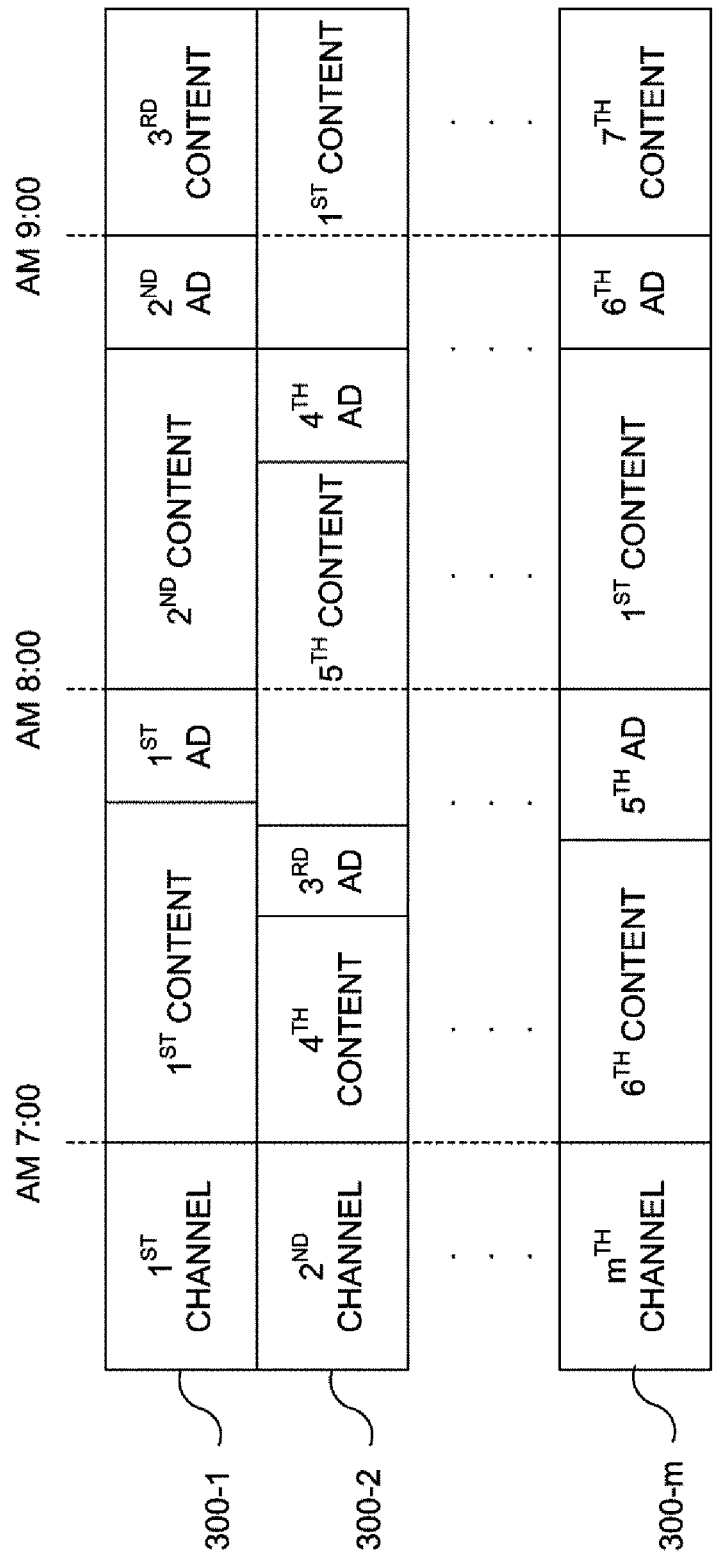
FIG. 3 shows an example of channels and broadcast schedules of the channels of the broadcasting service in the bounce rate measuring apparatus according to the embodiments described herein.

The specific content may be transmitted through one or more channels among the first channel 300-1 to the m-th channel 300-m. For example, as shown in FIG. 3, all of the broadcast schedules for the channels from the first channel 300-1 to the m-th channel 300-m may include a first content.

Preferably, the bounce rate of the content can be calculated from when a viewer switches to a specific channel and selects the specific content of the specific channel. In other words, in the specification, the bounce rate is measured when the viewer switches channels and, thus, the bounce rate is not measured, e.g., when the viewer watches the specific content without switching to the specific channel and when advertisement or other contents are being broadcasted at the time of selecting the specific channel. For example, the bounce rate of the content in this case may be defined as in the following Equation 3:

Bounce rate of a content=(the number of times that the specific content is provided by the receiver through each of the first channel 300-1 to the $m$-th channel 300-$m$ for a time period longer than or equal to the first threshold and shorter than or equal to the second threshold from the selection of each of the first channel 300-1 to the $m$-th channel 300-$m$ during a predetermined period)/(the total number of times that the specific content is provided by the receiver through each of the first channel 300-1 to the $m$-th channel 300-$m$ for a time period longer than or equal to the first threshold from the selection of each of the first channel 300-1 to the $m$-th channel 300-$m$ during the predetermined period).  <Equation 3>

Hereinafter, in the specification, the bounce rate of content is expressed as follows:

BR (identification information of content, start point of period, end point of period, first threshold, second threshold).

For example, BR (identification information of the first content, 2017-11-01 00:00:00, 2017-11-30 23:59:59, 3 seconds, 10 seconds) indicates a bounce rate of the first content that is measured while setting the first threshold to 3 seconds and the second threshold to 10 seconds during one month from November 1, 2017 at 00:00:00 to November 30, 2017 at 23:59:59.

c) Bounce Rate of Content Provided Through Channel

The bounce rate of a content provided through a channel is calculated based on information on the provision of a specific content through a specific channel.

Bounce rate of a content provided through a channel=(the number of times that the specific content is provided by the receiver through the specific channel for a time period longer than or equal to the first threshold and shorter than or equal to the second threshold during a predetermined period)/(the total number of times that the specific content is provided by the receiver through the specific channel for a time period longer than or equal to the first threshold during the predetermined period)  <Equation 4>

Preferably, the bounce rate of content and channel can be calculated from when the viewer switches to a specific channel and selects the specific content of the specific channel. In other words, in the specification, the bounce rate is measured when the viewer switches channels and, thus, the bounce rate is not measured, e.g., when the viewer watches the specific content without switching to the specific channel and when advertisement or other contents are being broadcasted at the time of selecting the specific channel. For example, the bounce rate of content and channel in this case may be defined as in the following Equation 5:

Bounce rate of a content provided through a channel=(the number of times that the specific content is provided by the receiver through the specific channel for a time period longer than or equal to the first threshold and shorter than or equal to the second threshold from the selection of the specific channel during a predetermined period)/(the total number of times that the specific content is provided by the receiver through the specific channel for a time period longer than or equal to the first threshold from the selection of the specific channel during the predetermined period)  <Equation 5>

Hereinafter, in the specification, the bounce rate of content and channel will be expressed as follows:

BR (identification information of content, identification information of channel, start point of period, end point of period, first threshold, second threshold).

For example, BR (identification information of the first content, the i-th channel, 2017-11-01 00:00:00, 2017-11-30 23:59:59, 3 seconds, 10 seconds) indicates a bounce rate of the i-th channel and the first content that is measured while setting the first threshold to 3 seconds and the second threshold to 10 seconds during one month from November 1, 2017 at 00:00:00 to November 30, 2017 at 23:59:59.

Referring back to FIG. 2, the broadcasting service system 200 is a system that provides broadcasting services. The broadcasting service system 200 is operated by an operator such as a broadcasting company, an IPTV operator, a cable TV operator, a VOD operator, and a home shopping operator. The broadcasting service system 200 is configured to transmit and receive data to and from the bounce rate measuring apparatus 100.

The broadcasting service system 200 can transmit, e.g., the first threshold and the second threshold, to the bounce rate measuring apparatus 100. Further, the bounce rate measuring apparatus 100 can transmit at least one of the bounce rate information and service provision information to be described later to the broadcasting service system 200.

FIG. 3 shows an example of channels and broadcast schedules of the channels of the broadcasting service in the bounce rate measuring apparatus according to the embodiments described herein.

Referring to FIG. 3, the broadcast schedules of the first channel 300-1 to the m-th channel 300-*m* (m being a natural number greater than or equal to 2) are illustrated. The broadcast schedules include contents provided through the channels and broadcasting time at which each of the contents is broadcasted. "m" can be appropriately determined based on the number of channels that are specified by the bounce rate measuring apparatus 100 to measure the bounce rate. For example, when the bounce rate measuring apparatus 100 measures the bounce rates of all of the channels of the broadcasting service, "m" may be the total number of the channels of the broadcasting service. For example, when the bounce rate measuring apparatus 100 measures the bounce rates of channels of particular group among all of the channels of the broadcasting service, "m" may be the number of the channels of the particular group.

Referring to FIG. 3, the broadcast schedule of the first channel 300-1 sequentially includes, e.g., a first content, a first advertisement, a second content, a second advertisement, and a third content in that order. The broadcast schedule of the second channel 300-2 sequentially includes, e.g., a fourth content, a third advertisement, a fifth content, a fourth advertisement, and the first content in that order. Further, the broadcast schedule of the m-th channel 300-*m* sequentially includes, e.g., a sixth content, a fifth advertisement, the first content, a sixth advertisement, and a seventh content in that order. As shown in FIG. 3, for example, the broadcast schedules of the first channel 300-1 to the m-th channel 300-*m* may all include the first content even though the broadcasting time of the first content for each channel is different from each other.

Hereinafter, the configuration of the bounce rate measuring apparatus 100 according to the embodiments described herein will be described in detail.

Figure 4:
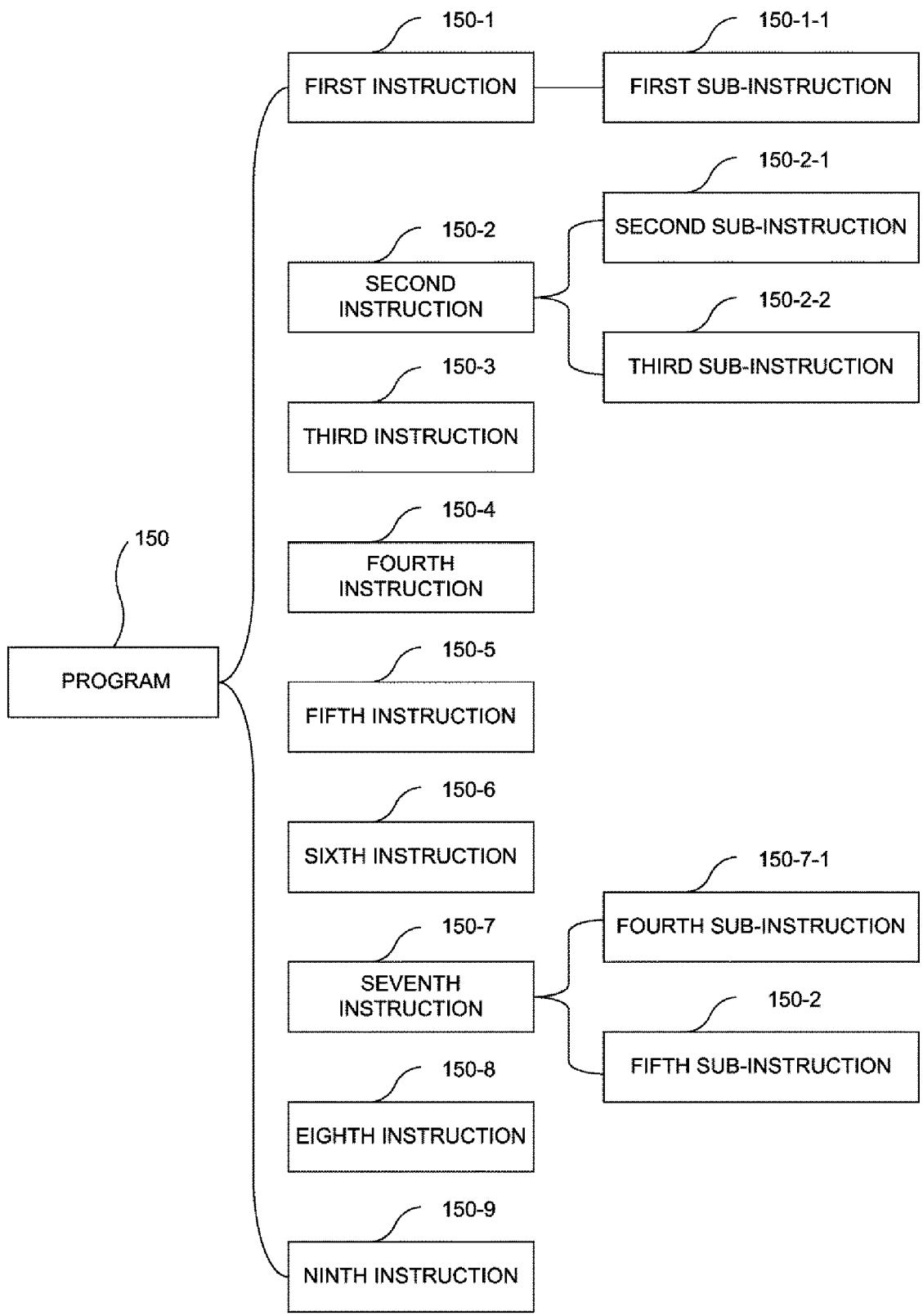
FIG. 4 is a block diagram showing an example of a program that is stored in and executed by the bounce rate measuring apparatus according to the embodiments described herein.

FIG. 4 is a block diagram showing a program that is stored in and executed by the bounce rate measuring apparatus according to the embodiments described herein.

Referring to FIG. 4, the program 150 includes a first instruction 150-1 to a third instruction 150-3. The program 150 may further include at least one of a fourth instruction 150-4 to a ninth instruction 150-9. The first instruction 150-1 may include a first sub-instruction 150-1-1. The second instruction 150-2 may include a second sub-instruction 150-2-1 and a third sub-instruction 150-2-2. The seventh instruction 150-7 may include a fourth sub-instruction 150-7-1 and a fifth sub-instruction 150-7-2.

The first instruction 150-1, when executed, generates the service provision information including information on the provision of one or more channels among the first channel 300-1 to the m-th channel 300-*m* of the broadcasting service. In other words, the first instruction 150-1 generates the service provision information including information on the provision of predetermined one or more channels among the channels provided by the broadcasting service system 200.

The one or more channels may be, e.g., one predetermined channel (e.g., the i-th channel) among the first channel to the m-th channel (i being a natural number greater than or equal to 1 and smaller than or equal to m). Alternatively, the one or more channels may be, e.g., two or more predetermined channels among the first channel to the m-th channel.

Hereinafter, the case where the i-th channel (i being a natural number greater than or equal to 1 and smaller than or equal to m) is determined as the predetermined channel among the one or more channels will be described.

The first instruction 150-1 may include a first sub-instruction 150-1-1 that, when executed, generates the service provision information based on a user input of selecting each of the one or more channels and a user input of leaving each of the one or more channels.

Hereinafter, the service provision information will be described in detail with reference to FIGS. 5 to 8.

A process of generating the service provision information, in the case of determining a channel No. 11 as the i-th channel in the bounce rate measuring apparatus 100, based on at least a user input of selecting the channel No. 11 and a user input of leaving the channel No. 11 will be described with reference to FIGS. 5 to 8.

FIG. 5 shows a process of selecting a channel and leaving the channel in the bounce rate measuring apparatus according to the embodiments described herein.

Referring to FIG. 5, the bounce rate measuring apparatus 100 receives, e.g., a user input of selecting the channel No. 11 through a remote controller at 07:15:05 AM (S110). Then, the bounce rate measuring apparatus 100 receives, e.g., a user input of selecting a channel No. 9 through the remote controller at 07:15:24 AM (S120). Next, the bounce rate measuring apparatus 100 receives, e.g., a user input of selecting a channel No. 7 through the remote controller at 07:25:17 AM (S130). Thereafter, the bounce rate measuring apparatus 100 receives, e.g., a user input of selecting the channel No. 11 again through the remote controller at 07:50:23 AM (S140). Then, the bounce rate measuring apparatus 100 receives, e.g., a user input of selecting a channel No. 13 through the remote controller at 07:50:25 AM (S150). Next, the bounce rate measuring apparatus 100 receives, e.g., a user input of selecting the channel No. 11 again through the remote controller at 08:05:10 AM (S160). Thereafter, the bounce rate measuring apparatus 100 receives, e.g., a user input of turning off the power through the remote controller at 08:05:30 AM (S170).

FIGS. 6 to 8 show examples of the service provision information generated by the process shown in FIG. 5.

Referring to FIG. 6, the service provision information is illustrated.

The service provision information may include channel identification information and a time at which an event has occurred through the remote controller. As shown in FIG. 6, for example, the service provision information may include "channel No. 11, 07:15:05 AM," "channel No. 9, 07:15:24 AM," "channel No. 7, 07:25:17 AM," "channel No. 11, 07:50:23 AM," "channel No. 13, 07:50:25 AM," "channel No. 11, 08:05:10 AM," and "turn-off, 08:05:30 AM."

Referring to FIG. 6, the bounce rate measuring apparatus 100 generates the service provision information based on all of the user inputs in association with the switching of the channels or the leaving of the channels. However, when the service provision information is generated based on all of the user inputs in association with the switching of the channels or the leaving of the channels, the data size of the service provision information becomes large.

Therefore, the service provision information may be simplified to include identification information of one or more channels, time at which the bounce rate measuring apparatus 100 receives a user input of selecting each of one or more channels (i.e., time at which a user selects each of the one or more channels), and time at which the bounce rate measuring apparatus 100 receives a user input of leaving each of the one or more channels (i.e. time at which a user leaves each of the one or more channels).

Referring to FIG. 7, when the channel No. 11 is determined as the predetermined channel of the one or more channels, the bounce rate measuring apparatus 100 generates the service provision information based on a user input of selecting the channel No. 11 and a user input of leaving the channel No. 11. The user input of leaving the channel No. 11 includes a power button input, i.e., turn-off, shown in step S170.

Referring to FIG. 7, the service provision information may include identification information of the one or more channels, i.e., identification information of the channel No. 11 in the above example, time at which the bounce rate measuring apparatus 100 receives the user input of selecting the channel No. 11, and time at which the bounce rate measuring apparatus 100 receives the user input of leaving the channel No. 11. For example, referring to FIG. 7, the time at which the user input of selecting the channel No. 11 is received and the time at which the the user input of leaving the channel No. 11 is received are "07:15:05 AM, 07:15:24 AM," "07:50:23 AM, 07:50:25 AM," "08:05:10 AM, 08:05:30 AM," "08:30:10 AM, 08:50:30 AM," "9:10:00 AM, 9:40:30 AM," and "10:05:00 PM, 10:50:30 PM."

Further, referring to FIG. 8, the service provision information may include identification information of each of the one or more channels, i.e., identification information of the channel No. 11 in the above example, time at which the bounce rate measuring apparatus 100 receives a user input of selecting the channel No. 11, and a time difference between the time at which the bounce rate measuring apparatus 100 receives the user input of selecting the channel No. 11 and the time at which the bounce rate measuring apparatus 100 receives the user input of leaving the channel No. 11. For example, referring to the time at which the user input of selecting the channel No. 11 is received and the time at which the first receiver 200-1 receives the user input of leaving the channel No. 11 shown in FIG. 7, the service provision information includes "07:15:05 AM, 19 seconds," "07:50:23 AM, 2 seconds," "08:05:10 AM, 20 seconds," "08:30:10 AM, 20 seconds," "9:10:00 AM, 10 minutes and 30 seconds," and "10:05:40 PM, 40 minutes and 30 seconds." The time difference indicates the time period during which the channel No. 11 is provided by the bounce rate measuring apparatus 100. In other words, the time difference indicates the time period of continuing to view the channel No. 11.

The second instruction 150-2, when executed, analyzes the service provision information generated by the first instruction 150-1 to determine a first number of times based on the number of times that each of the one or more channels is provided for a time period longer than or equal to the first threshold during the predetermined period and to determine a second number of times based on the number of times that each of the one or more channels is provided for a time period longer than or equal to the first threshold and shorter than or equal to the second threshold during the predetermined period.

The first number of times and the second number of times are values used by the third instruction 150-3 to be described later to extract the bounce rate information of each of the one or more channels.

The first number of times may be directly set to, e.g., the number of times that each of the one or more channels is provided by the bounce rate measuring apparatus 100 for the time period longer than or equal to the first threshold during the predetermined period. The second number of times may be directly set to, e.g., the number of times that each of the one or more channels is provided by the bounce rate measuring apparatus 100 for the time period longer than or equal to the first threshold and shorter than or equal to the second threshold during the predetermined period.

In the case of determining the first number of times and the second number of times to extract the bounce rate information of each of the one or more channels, e.g., the bounce rate information of the channel No. 11, it is preferable to exclude the case where advertisement information is provided through the channel No. 11. In other words, when the advertisement information is provided, viewers often switch to other channels without continuing to watch the channel.

The second instruction 150-2 may include the second sub-instruction 150-2-1 and the third sub-instruction 150-2-2.

The second sub-instruction 150-2-1, when executed, determines the first number of times by subtracting, from the number of times that each of the one or more channels is provided for the time period longer than or equal to the first threshold during the predetermined period, the number of times that each of the one or more channels is provided for the time period longer than or equal to the first threshold within a time period in which the advertisement information is scheduled to each of the one or more channels, which is determined by comparing the service provision information and the scheduling information of each of the one or more channels, during the predetermined period.

The third sub-instruction 150-2-2, when executed, determines the second number of times by subtracting, from the number of times that each of the one or more channels is provided for the time period longer than or equal to the first threshold and shorter than or equal to the second threshold during the predetermined period, the number of times that each of the one or more channels is provided for the time period longer than or equal to the first threshold and shorter than or equal to the second threshold within the time period in which the advertisement information is scheduled to each of the one or more channels during the predetermined period.

As shown in FIG. 6, for example, when the channel No. 11 is determined as the predetermined channel of the one or more channels and the advertisement information is provided through the channel No. 11 for 2 seconds from 07:50:23 AM, the case where the channel No. 11 is provided for 2 seconds from 07:50:23 AM is not included in the calculation of the first number of times. Further, for example, when the one or more channels include another channel in addition to the channel No. 11, the case where the advertisement information is provided through another channel is not included in the calculation of the first number of times for that channel.

The bounce rate information for each of the one or more channels, e.g., the bounce rate information of the channel No. 11 in the above example, can be more accurately extracted by the second sub-instruction 150-2-1 and the third sub-instruction 150-2-2.

Referring back to FIG. 4, the third instruction 150-3, when executed, extracts the bounce rate information of each of the one or more channels based on the first number of times and the second number of times determined by the second instruction 150-2. For example, if the channel No. 11 is determined as the predetermined channel of the one or more channels, the third instruction 150-3 extracts the bounce rate information of the channel No. 11.

The bounce rate information of each of the one or more channels includes a ratio of the second number of times to the first number of times. The bounce rate information of each of the one or more channels may further include at least one of the first number of times, the information on the predetermined period, and the identification information of the corresponding one of the one or more channels.

Specifically, the bounce rate information of each of the one or more channels includes the first number of times to extract the frequency of visits to each of the one or more channels based on the number of times in which the viewer has selected each of the one or more channels.

The bounce rate information of each of the one or more channels includes the information on the predetermined period and the identification information of the corresponding one of the one or more channels in order to identify an extraction period of the bounce rate information of the corresponding one of the one or more channels and a target channel in the case of transmitting the bounce rate information of the corresponding one of the one or more channels from the bounce rate measuring apparatus 100 to the broadcasting service system 200 and other external devices. When the bounce rate information of each of the one or more channels is transmitted to the broadcasting service system 200, the identification information of the bounce rate measuring apparatus 100 may also be transmitted.

For example, BR (channel identification information, start point of period, end point of period, first threshold, second threshold) can be extracted by the first instruction 150-1 to the third instruction 150-3.

Further, by changing the first threshold, the second threshold, the start point of the period, the end point of the period, and the channel identification information, it is possible to extract the bounce rate information of a desired channel using desired thresholds and a desired period.

The bounce rate of the i-th channel can be used as, e.g., an index for evaluating the viewer loyalty to the i-th channel. In other words, if the bounce rate is low in spite of a low rating of the i-th channel, it is determined that the viewer loyalty to the i-th channel is high. On the other hand, if the bounce rate is high in spite of a high rating of the i-th channel, it is determined that the viewer loyalty to the i-th channel is low.

Referring back again to FIG. 4, the one or more programs 150 may further include the fourth instruction 150-4 that, when executed, receives at least one of the first threshold and the second threshold from the predetermined broadcasting service system 200 before the second instruction 150-2 is executed. In other words, the first threshold and the second threshold can be determined by the broadcasting service system 200 and transmitted to the bounce rate measuring apparatus 100.

Referring back again to FIG. 4, the one or more programs 150 may further include the fifth instruction 150-5 that, when executed, dynamically selects the second threshold based on the identification information of each of the one or more channels among a plurality of predetermined thresholds. In other words, the bounce rate measuring apparatus 100 executes the fifth instruction 150-5 to dynamically and directly select the second threshold, instead of using the second threshold after receiving the second threshold from the broadcasting service system 200.

Referring back again to FIG. 4, the one or more programs 150 may further include the sixth instruction 150-6 that, when executed, transmits at least one of the service provision information generated by the first instruction 150-1 and the bounce rate information of each of the one or more channels extracted by the third instruction to the predetermined broadcasting service system 200.

The broadcasting service system 200 may receive the service provision information from a plurality of receivers including the bounce rate measuring apparatus 100 and directly extract the bounce rate information. Alternatively, the broadcasting service system 200 may receive the bounce rate information of each of the one or more channels from a plurality of receivers including the bounce rate measuring apparatus 100 and extract the bounce rate information of each of the one or more channels from all of the receivers.

Second Embodiment

The first embodiment has been described based on the extraction of the bounce rate information of each of the one or more channels, e.g., the i-th channel. However, it is also possible to extract the bounce rate information in the case of providing the specific content through the one or more channels in the bounce rate measuring apparatus 100.

Referring back to FIG. 4, the program 150 may further include the seventh instruction 150-7 and the eighth instruction 150-8.

The seventh instruction 150-7, when executed, analyzes the service provision information and the broadcast schedule information of each of the one or more channels to determine a third number of times based on the number of times that a predetermined content is provided through each of the one or more channels for a time period longer than or equal to the first threshold during a predetermined period and to determine a fourth number of times based on the number of times that the predetermined content is provided through each of the one or more channels for a time period longer than or equal to the first threshold and shorter than or equal to the second threshold during the predetermined period.

The one or more channels may be, e.g., one predetermined channel (e.g., the i-th channel where i is a natural number greater than or equal to 1 and smaller than or equal to m) among the first channel to the m-th channel. Alternatively, the one or more channels may be, e.g., two or more predetermined channels among the first channel to the m-th channel.

The eighth instruction 150-8, when executed, extracts the bounce rate information of the predetermined content based on the third number of times and the fourth number of times determined by the seventh instruction 150-7. For example, when the i-th channel is determined as the predetermined channel among the one or more channels, the eighth instruction 150-8 extracts the bounce rate information of the content through the i-th channel.

The bounce rate information of the predetermined content includes a ratio of the fourth number of times to the third number of times. The bounce rate information of the predetermined content may further include at least one of the third number of times, the information on the predetermined period, the content identification information, and the identification information of each of the one or more channels.

As described above, it is preferred that the bounce rate of the content is calculated from when a viewer switches to a specific channel and selects the specific content of the specific channel. In other words, in the specification, the bounce rate is measured when the viewer switches channels and, thus, the bounce rate is not measured, e.g., when the viewer watches the specific content without switching to the specific channel and when advertisement or other contents are being broadcasted at the time of selecting the specific channel.

The seventh instruction 150-7 may include the fourth sub-instruction 150-7-1 and the fifth sub-instruction 150-7-2.

The fourth sub-instruction 150-7-1, when executed, determines the third number of times based on the number of times that a predetermined content is provided through each of the one or more channels for a time period longer than or equal to the first threshold from the selection of the corresponding one of the one or more channels during a predetermined period.

The fifth sub-instruction 150-7-2, when executed, determines the fourth number of times based on the number of times that the predetermined content is provided through each of the one or more channels for a time period longer than or equal to the first threshold and shorter than or equal to the second threshold from the selection of the corresponding one of the one or more channels during the predetermined period.

Accordingly, it is possible to more accurately calculate the bounce rate and obtain the bounce rate information of the content.

For example, BR (content identification information, start point of period, end point of period, first threshold, second threshold) can be extracted by the first instruction 150-1, the seventh instruction 150-7, and the eighth instruction 150-8. In other words, when the one or more channels include all of the channels of the first channel 300-1 to the m-th channel 300-m as the predetermined channels, BR (content identification information, start point of period, end point of period, first threshold, second threshold) can be extracted by the first instruction 150-1, the seventh instruction 150-7, and the eighth instruction 150-8.

For example, BR (content identification information, channel identification information, start point of period, end point of period, first threshold, second threshold) can be extracted by the first instruction 150-1, the seventh instruction 150-7, and the eighth instruction 150-8. In other words, when the i-th channel is determined as the predetermined channel among the one or more channels, for example, BR (identification information of the content, identification information of the i-th channel, start point of period, end point of period, first threshold, second threshold) can be extracted by the first instruction 150-1, the seventh instruction 150-7, and the eighth instruction 150-8.

By changing the first threshold, the second threshold, the content identification information, the channel identification information, the start point of the period, and the end point of the period, it is possible to extract the bounce rate information of a desired channel using desired thresholds and a desired period.

The bounce rate of the content can be used, e.g., as an index for evaluating the viewer loyalty to the content. In other words, if the bounce rate of the specific content is low in spite of a low rating of the specific content, it is determined that the viewer has a high loyalty to the content. On the other hand, if the bounce rate of the specific content is high in spite of a high rating of the specific content, it is determined that the viewer has a low loyalty to the content.

The bounce rate of the content through the i-th channel can be used, e.g., as an index for evaluating the loyalty of a viewer of the i-th channel to the content of the i-th channel. In other words, if the bounce rate of the content through the i-th channel is low in spite of a low rating of the i-th channel, it is determined that the loyalty of the viewer of the i-th channel to the content of the i-th channel is high. On the contrary, if the bounce rate of the content through the i-th channel is high in spite of a high rating of the i-th channel, it is determined that the loyalty of the viewer of the i-th channel to the content of the i-th channel is low.

Referring back to FIG. 4, the program 150 may further include a ninth instruction 150-9.

The ninth instruction 150-9, when executed, transmits the bounce rate information of the predetermined content extracted by the eighth instruction 150-8 to the predetermined broadcasting service system 200.

The broadcasting service system 200 may receive the bounce rate information of the content from a plurality of receivers including the bounce rate measuring apparatus 100 and extract the bounce rate information of the content from all of the receivers.

As described above, in accordance with the embodiments described herein, there is provided the bounce rate measuring apparatus for measuring the bounce rate of the broadcasting service using the service provision information generated based on a viewer's behavior of selecting a channel and leaving the channel.

According to the embodiments described herein, it is possible to extract information such as viewer's reaction, which cannot be evaluated by a present viewer rating of the broadcasting service, based on the measured bounce rate.

Further, according to the embodiments described herein, the measured bounce rate can be used alone or in combination with the present viewer rating in order to evaluate quality of the broadcasting services or to find out interests of viewers.

While various examples according to the technique have been described in detail, the above descriptions merely illustrates the idea of the technique described herein, and it will be understood by those skilled in the art to which the technique described herein belongs that various changes and modifications may be made without departing from the scope of the essential characteristics of the technique described herein.

Accordingly, the exemplary embodiments disclosed herein are not used to limit the idea of the technique described herein, but to explain the technique described herein, and the scope of the technical idea of the technique described herein is not limited by those embodiments. Therefore, the scope of protection of the technique described herein should be construed as defined in the following claims, and all technical ideas that fall within the idea of the technique described herein are intended to be embraced by the scope of the claims described below.

In accordance with the technique described herein, there is provided a bounce rate measuring apparatus for measuring a bounce rate of a broadcasting service using service provision information generated based on a viewer's behavior of selecting a channel and leaving the channel.

According to the technique described herein, it is possible to extract information such as viewer's reaction, which cannot be evaluated by a present viewer rating of the broadcasting service, based on the measured bounce rate.

Further, according to the technique described herein, the measured bounce rate can be used alone or in combination with the present viewer rating in order to evaluate quality of the broadcasting service or to find out interests of viewers.

[Supplementary Notes]

Embodiments of the technique described herein will be supplementarily described below.

<Supplementary Note 1>

According to one aspect of the present disclosure, there is provided a method of measuring a bounce rate for a broadcasting service by using a bounce rate measuring apparatus for a broadcasting service including: one or more memories storing the program therein; and one or more processors configured to execute the program, the method including:

(a) generating service provision information including information on provision of one or more channels among a first channel to a m-th channel of the broadcasting service (where m is a natural number of 2 or higher);

(b) analyzing the service provision information to determine a first number of times based on the number of times that each of the one or more channels is provided for a time period longer than or equal to a first threshold during a predetermined period and a second number of times based on the number of times that each of the one or more channels is provided for a time period longer than or equal to the first threshold and shorter than or equal to a second threshold during the predetermined period; and (c) extracting bounce rate information of each of the one or more channels based on the first number of times and the second number of times.

<Supplementary Note 2>

The method of Supplementary note 1, further including:

(d) receiving at least one among the first threshold and the second threshold from a predetermined broadcasting service system before performing (b).

<Supplementary Note 3>

The method of Supplementary note 1, further including:

(e) dynamically selecting the second threshold based on identification information of each of the one or more channels among a plurality of predetermined thresholds.

<Supplementary Note 4>

The method of Supplementary note 1, further including:

(f) transmitting at least one of the service provision information and the bounce rate information of each of the one or more channels to a predetermined broadcasting service system.

<Supplementary Note 5>

The method of Supplementary note 1, wherein (a) includes:

(a-1) generating the service provision information based on a user input of selecting each of the one or more channels and a user input of leaving each of the one or more channels.

<Supplementary Note 6>

The method of Supplementary note 1, wherein the service provision information includes identification information of each of the one or more channels, time of selecting each of the one or more channels, and time of leaving each of the one or more channels.

<Supplementary Note 7>

The method of Supplementary note 1, wherein the service provision information includes identification information of each of the one or more channels, time of selecting each of the one or more channels, and a difference between the time of selecting each of the one or more channels and time of leaving each of the one or more channels.

<Supplementary Note 8>

The method of Supplementary note 1, wherein (b) includes:

(b-1) determining the first number of times by subtracting, from the number of times that each of the one or more channels is provided for the time period longer than or equal to the first threshold during the predetermined period, the number of times that each of the one or more channels is provided for the time period longer than or equal to the first threshold within a time period in which advertisement information is scheduled to each of the one or more channels, which is determined by comparing the service provision information and scheduling information on of each of the one or more channels, during the predetermined period; and (b-2) determining the second number of times by subtracting, from the number of times that each of the one or more channels is provided for the time period longer than or equal to the first threshold and shorter than or equal to the second threshold during the predetermined period, the number of times that each of the one or more channels is provided for the time period longer than or equal to the first threshold and shorter than or equal to the second threshold within the time period in which the advertisement information is scheduled to each of the one or more channels during the predetermined period.

<Supplementary Note 9>

The method of Supplementary note 1, wherein the one or more channels is a i-th channel that is predetermined among the first channel to the m-th channel (where i is a natural number greater than or equal to 1 and smaller than or equal to m).

<Supplementary Note 10>

The method of Supplementary note 1, wherein the bounce rate information of each of the one or more channels includes a ratio of the second number of times to the first number of times.

<Supplementary Note 11>

The method of Supplementary note 10, wherein the bounce rate information of each of the one or more channels further includes: at least one of the first number of times, information on the predetermined period, and identification information of each of the one or more channels.

<Supplementary Note 12>

The method of Supplementary note 1, further including:

(g) analyzing the service provision information and broadcast schedule information of each of the one or more channels to determine a third number of times based on the number of times that a predetermined content is provided through each of the one or more channels for the time period longer than or equal to the first threshold during the predetermined period and to determine a fourth number of times based on the number of times that the predetermined content is provided through each of the one or more channels for the time period longer than or equal to the first threshold and shorter than or equal to the second threshold during the predetermined period; and (h) extracting bounce rate information of the predetermined content based on the third number of times and the fourth number of times.

<Supplementary Note 13>

The method of Supplementary note 12, wherein the bounce rate information of the predetermined content includes a ratio of the fourth number of times to the third number of times.

<Supplementary Note 14>

The method of Supplementary note 13, wherein the bounce rate information of the predetermined content further includes: at least one of the third number of times, information on the predetermined period, identification information of the predetermined content, identification information of each of the one or more channels.

<Supplementary Note 15>

The method of Supplementary note 12, wherein (g) further includes:

(g-1) determining the third number of times based on the number of times that the predetermined content is provided through each of the one or more channels for the time period longer than or equal to the first threshold from a selection of each of the one or more channels during the predetermined period; and (g-2) determining the fourth number of times based on the number of times that the predetermined content is provided through each of the one or more channels for the time period longer than or equal to the first threshold and shorter than or equal to the second threshold from the selection of each of the one or more channels during the predetermined period.

<Supplementary Note 16>

The method of Supplementary note 12, further including:

(i) transmitting the bounce rate information of the predetermined content to a predetermined broadcasting service system.

EXPLANATION OF REFERENCE SYMBOLS

100: bounce rate measuring apparatus
110: processor
130: memory
150: program
200: broadcasting service system
300: channel

What is claimed is:

1. A bounce rate measuring apparatus for a broadcasting service comprising:
    one or more processors;
    one or more memories; and
    one or more programs that are stored in the one or more memories and executed by the one or more processors, wherein the one or more programs include:
        a first instruction that, when executed, generates service provision information including information on provision of one or more channels among a first channel to a m-th channel of the broadcasting service (where m is a natural number of 2 or higher);
        a second instruction that, when executed, analyzes the service provision information to determine a first number of times based on the number of times that each of the one or more channels is provided for a time period longer than or equal to a first threshold during a predetermined period and a second number of times based on the number of times that each of the one or more channels is provided for a time period longer than or equal to the first threshold and shorter than or equal to a second threshold during the predetermined period;
        a third instruction that, when executed, extracts bounce rate information of each of the one or more channels based on the first number of times and the second number of times: and
        a fourth instruction that, when executed, dynamically selects the second threshold based on identification information of each of the one or more channels among a plurality of predetermined thresholds,
    wherein the first threshold is determined while considering a delay time from when a receiver receives a user input of selecting the one or more channels to when the one or more channels are signal-processed and provided to a viewer, and
    the second threshold is a period of time required for the viewer who has selected the one or more channels and has checked a content of the one or more channels to determine whether to keep watching the one or more channels or to switch to another channel.

2. The bounce rate measuring apparatus of claim 1, wherein the one or more programs further includes:
    a fifth instruction that, when executed, receives at least one among the first threshold and the second threshold from a predetermined broadcasting service system before the second instruction is executed.

3. The bounce rate measuring apparatus of claim 1, wherein the one or more programs further include:
    a sixth instruction that, when executed, transmits at least one of the service provision information and the bounce rate information of each of the one or more channels to a predetermined broadcasting service system.

4. The bounce rate measuring apparatus of claim 1, wherein the first instruction includes:
    a first sub-instruction that, when executed, generates the service provision information based on a user input of selecting each of the one or more channels and a user input of leaving each of the one or more channels.

5. The bounce rate measuring apparatus of claim 1, wherein the service provision information includes identification information of each of the one or more channels, time of selecting each of the one or more channels, and time of leaving each of the one or more channels.

6. The bounce rate measuring apparatus of claim 1, wherein the service provision information includes identification information of each of the one or more channels, time of selecting each of the one or more channels, and a difference between the time of selecting each of the one or more channels and time of leaving each of the one or more channels.

7. The bounce rate measuring apparatus of claim 1, wherein the second instruction includes:
    a second sub-instruction that, when executed, determines the first number of times by subtracting, from the number of times that each of the one or more channels is provided for the time period longer than or equal to the first threshold during the predetermined period, the number of times that each of the one or more channels is provided for the time period longer than or equal to the first threshold within a time period in which advertisement information is scheduled to each of the one or more channels, which is determined by comparing the service provision information and the scheduling information on of each of the one or more channels, during the predetermined period; and a third sub-instruction that, when executed, determines the second number of times by subtracting, from the number of times that each of the one or more channels is provided for the time period longer than or equal to the first threshold and shorter than or equal to the second threshold during the predetermined period, the number of times that each of the one or more channels is provided for the time period longer than or equal to the first threshold and shorter than or equal to the second threshold within the time period in which the advertisement information is scheduled to each of the one or more channels during the predetermined period.

8. The bounce rate measuring apparatus of claim 1, wherein the one or more channels is a i-th channel that is predetermined among the first channel to the m-th channel (where i is a natural number greater than or equal to 1 and smaller than or equal to m).

9. The bounce rate measuring apparatus of claim 1, wherein the bounce rate information of each of the one or more channels includes a ratio of the second number of times to the first number of times.

10. The bounce rate measuring apparatus of claim 9, wherein the bounce rate information of each of the one or more channels further includes:

at least one of the first number of times, information on the predetermined period, and identification information of each of the one or more channels.

11. The bounce rate measuring apparatus of claim 1, further including:

a seventh instruction that, when executed, analyzes the service provision information and broadcast schedule information of each of the one or more channels to determine a third number of times based on the number of times that a predetermined content is provided through each of the one or more channels for a time period longer than or equal to the first threshold during the predetermined period and to determine a fourth number of times based on the number of times that the predetermined content is provided through each of the one or more channels for a time period longer than or equal to the first threshold and shorter than or equal to the second threshold during the predetermined period; and an eighth instruction that, when executed, extracts bounce rate information of the predetermined content based on the third number of times and the fourth number of times.

12. The bounce rate measuring apparatus of claim 11, wherein the bounce rate information of the predetermined content includes a ratio of the fourth number of times to the third number of times.

13. The bounce rate measuring apparatus of claim 12, wherein the bounce rate information of the predetermined content further includes:

at least one of the third number of times, information on the predetermined period, identification information of the predetermined content, identification information of each of the one or more channels.

14. The bounce rate measuring apparatus of claim 11, wherein the seventh instruction includes:

a fourth sub-instruction that, when executed, determines the third number of times based on the number of times that the predetermined content is provided through each of the one or more channels for the time period longer than or equal to the first threshold from a selection of each of the one or more channels during the predetermined period; and a fifth sub-instruction that, when executed, determines the fourth number of times based on the number of times that the predetermined content is provided through each of the one or more channels for the time period longer than or equal to the first threshold and shorter than or equal to the second threshold from the selection of each of the one or more channels during the predetermined period.

15. The bounce rate measuring apparatus of claim 11, wherein the one or more programs further include:

a ninth instruction that, when executed, transmits the bounce rate information of the predetermined content to a predetermined broadcasting service system.

* * * * *